UNITED STATES PATENT OFFICE.

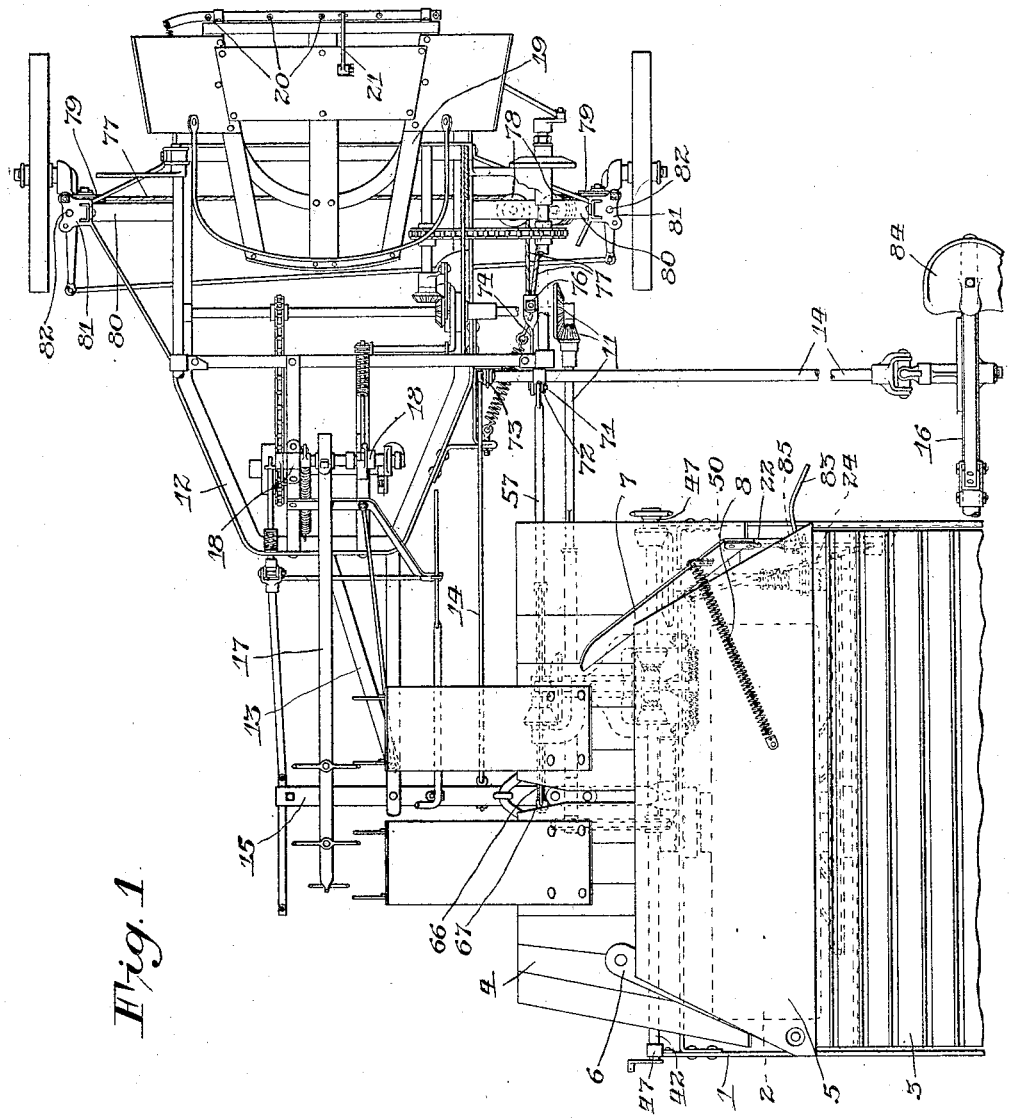

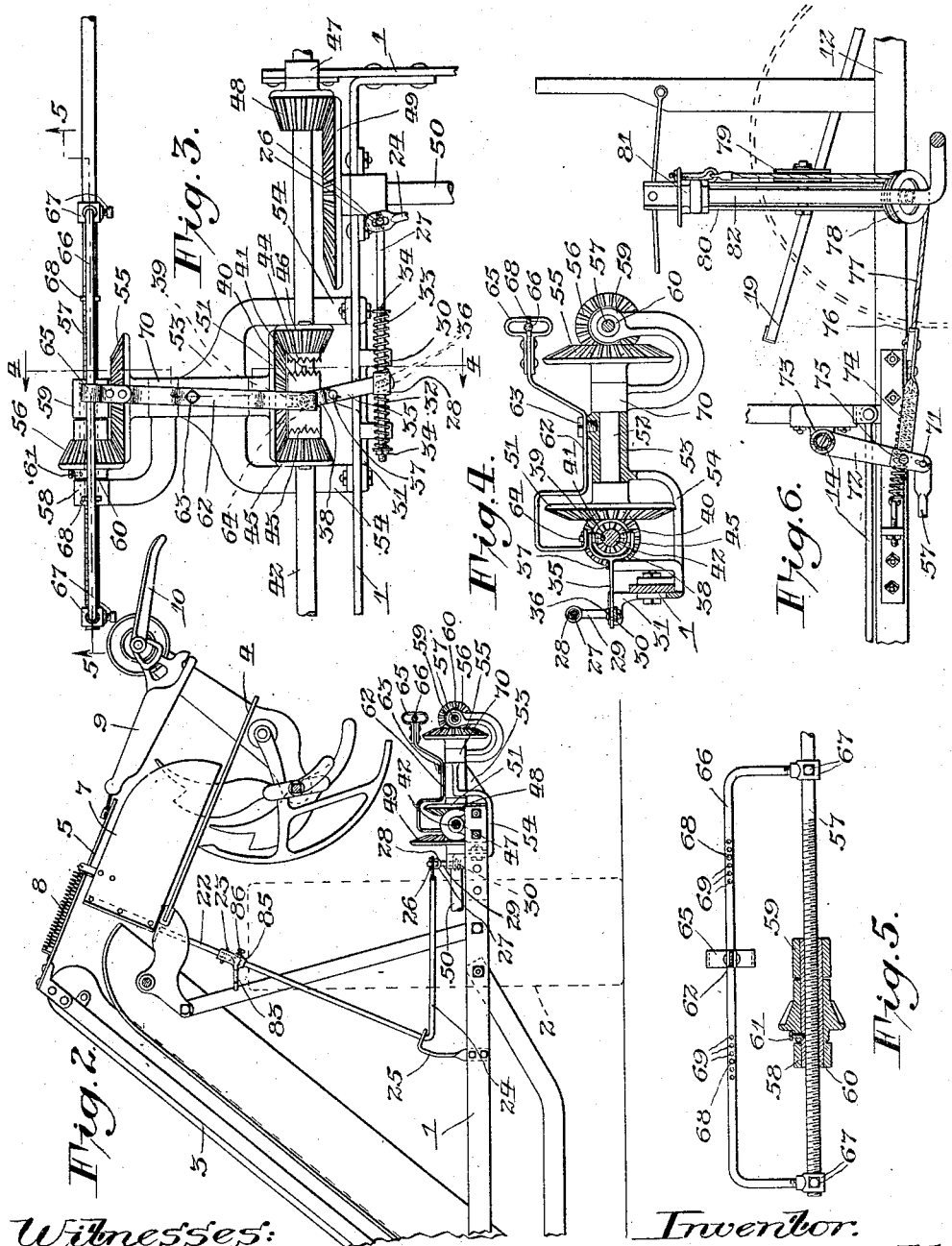

HORACE L. ROCKWELL, OF CHICAGO, ILLINOIS, ASSIGNOR TO INTERNATIONAL HARVESTER COMPANY OF NEW JERSEY, A CORPORATION OF NEW JERSEY.

SHOCKING-MACHINE.

1,211,880. Specification of Letters Patent. Patented Jan. 9, 1917.

Application filed May 18, 1914. Serial No. 839,257.

*To all whom it may concern:*

Be it known that I, HORACE L. ROCKWELL, a citizen of the United States, residing at Chicago, in the county of Cook and State of Illinois, have invented certain new and useful Improvements in Shocking-Machines, of which the following is a full, clear, and exact specification.

My invention relates to shocking machines for grain or the like.

When working in grain of different lengths it has been found advisable in the use of a shocker having a dumping shock receptacle, to adjust the receptacle with respect to the ground as the length of the grain varies, in order that the butts of shocks formed of sheaves of long grain may not be crumpled when the receptacle is operated to set the shock. This adjustment of the receptacle has heretofore been made by means of manually operated adjusting mechanism operable from the binder so that the operator on the binder, when the latter machine moves into long or short grain, by adjusting certain manually operated lever mechanism on the binder, may adjust the position of the shock receptacle as desired and thereby accommodate the shocker to the changed conditions.

My invention has among its objects to adjust the shock receptacle in an improved manner whereby the position of the latter may be varied automatically in accordance with the variations in the length of the grain being shocked and the necessity for this manual adjustment on the part of the operator is avoided.

A further object of my invention is to provide improved means for adjusting the height of the shock receptacle whereby, at the will of the operator, this shock receptacle may be raised or lowered with respect to the ground by the team drawing the harvester, the necessity for the operator doing the manual work of adjusting the parts being thereby eliminated.

These and other objects of my invention will more fully hereinafter appear.

I attain these objects by providing improved operative connections operatively connected to the shock setting mechanism of the shocker whereby, as the grain varies in length, that mechanism may be either automatically, or under the control of the operator, connected to a moving part of the equipment in such a manner as to be adjusted with respect to the ground and as a result under all conditions, maintain the shock receptacle in that position found most desirable in producing a stable shock well adapted to stand in the field.

In order that my invention may be clearly and fully disclosed, I shall herein specifically describe one embodiment thereof, *i. e.*, that wherein the controlling mechanism is acted upon by the grain passing over the binder deck, this description being given with the understanding that the form of my invention shown is used only for purposes of illustration and that the invention itself is to be in nowise limited thereto, but may be embodied in various other forms without departing from its spirit.

In these drawings: Figure 1 represents a plan view of a binder and shocker equipped with my improvement, the sheaf binding mechanism of the binder being omitted to facilitate clearness of illustration. Fig. 2 is a rear elevation of a portion of the binder and its connections to the shocker, certain well known parts of the binder mechanism being illustrated diagrammatically. Fig. 3 is a plan view of a portion of the controlling mechanism. Fig. 4 is a detail sectional view taken approximately on line 4—4 of Fig. 3. Fig. 5 is a further detail view taken approximately on line 5—5 of Fig. 3. Fig. 6 is a detail view of the receptacle adjusting means on the shocker.

The construction shown, when broadly considered, comprises a binder having a shocker operatively connected thereto, and improved connections between the binder and the shocker whereby, as the grain passing over the binder deck varies in length, this grain, or the operator, adjusts the mechanism operatively connected to the binder and driven therefrom for raising or lowering the shock receptacle with respect to the ground in accordance with the variations in the length of the grain.

The binder shown is of well known and standard construction, comprising a machine frame 1 carried on a main wheel 2 and having conveyers 3 supplying grain to the binder deck 4 and beneath the upper binder deck 5, all in a well known manner. Acting upon the grain as it passes between these decks 4 and 5 is the usual grain adjusting mechanism comprising the swinging butt adjuster 6 and the coöperating swinging head board 7 normally held in its inward position by a spring 8 operatively connected between it and the upper deck 5, while coöperating with this adjusting mechanism is the usual sheaf forming and binding mechanism 9 and discharging mechanism 10. (Fig. 2.) As no part of this mechanism *per se* forms a part of my present invention and is well known in the art, it seems unnecessary herein to describe the same more specifically.

The shocker shown is driven from the binder through universal power connections 11 and is in general of the automatic construction devised by Clemma R. Raney. As shown, it includes a horizontally disposed wheeled frame 12 operatively connected through a tongue 13 and draft connections 14 with a support 15, projecting stubblewardly beneath the binder deck 4, and the binder seat pipe 16 in such a manner that the shocker may rise and fall with respect to the binder. Upon this frame 12 a swinging, automatically operated sheaf delivery member 17 is pivoted in suitable bearings 18 in such a manner that it may be moved from its normal or prostrate position, shown in Fig. 1, upward and rearward in a substantially upright plane to deliver the sheaves discharged by the discharging mechanism 10 to a normally prostrate, rearwardly tiltable, automatically operable shock receptacle 19 pivotally mounted at the rear of the shocker frame 12 and having coöperating therewith the usual upstanding end tines 20 normally held in position and releasable from the receptacle as the latter is tilted by suitable latching mechanism 21. As this shocker *per se* forms no part of my present invention, however, it likewise seems unnecessary to describe the same herein more specifically.

I will first describe the automatic feature of my improvement wherein the shocker is automatically adjusted in accordance with variations in the length of the grain. When so operative the head board 7 of the binder acts as the controlling member for the adjusting mechanism of the shocker. As shown, this board is attached at its grainward end to the upper end of an upstanding, slightly stubblewardly disposed rod 22 journaled on the binder deck and operatively connected at its lower end, as by a socket and driving pin connection 23, to the upturned grainward end of a stubblewardly extending rod 24 journaled in a bracket 25 in the frame 1. This rod 24 extends stubblewardly, as indicated, and slightly forward toward a point beneath the edge of the binder deck, as shown in Fig. 1, where it is pivotally connected preferably through a slot and pin connection 26 to the upturned end of a third longitudinally disposed rod 27 slidably mounted in a collar 28 on a standard 29, which is in turn slidably connected in a slide-way 30 on a bracket 31 carried on the frame 1. As shown, this rod 27 is spring-pressed by a plurality of opposing springs 32, 33 carried thereon on opposite sides of the collar 28 and having their tension adjustable by suitable tension adjusting devices 34. Operatively connected to this rod 27 through the movable standard 29 is the means for throwing the shock receptacle adjusting means into gear with the binder so that the actual work of adjusting is done by the team. These means are connected to the standard 29 and slidable with the latter with respect to the slide-way 30. As shown, a clutch shipping member 35 is operatively connected at one end to the standard 29 through a slot and pin connection 36 and pivoted at a point intermediate its ends at 37 on the bracket 31. This member 35 has a yoke 38 thereon operatively connected at 39 to a longitudinally movable clutch member 40 splined at 41 on the usual pitman shaft 42 of the binder and adapted to engage with one or the other of a plurality of coöperating spaced ratchet faces 43, 44, preferably formed integral with a plurality of beveled gears 45, 46 freely rotatable on the binder pitman shaft mentioned. As in the usual manner, this pitman shaft 42 is journaled in the frame 1 at 47 beneath the binder deck 4 and is rotated by the meshing of a beveled gear 48 thereon with a beveled gear 49 carried on the end of the main power shaft 50 on the binder. It is thus seen that when the head board 7 is forced back by the pressure of long grain from the position shown in Fig. 1, it will, through the connections 22, 24, 27, etc., and the connection of the springs, throw the clutch shipping member 35 about its pivot 37 to shift the clutch member 40 into engagement with the ratchet face 43 on the left-hand beveled gear 45, while, when the grain decreases in length, this member will be thrown into engagement with the ratchet face 44 on the right-hand beveled gear 46.

Meshing with each of the gears 45, 46 is a coöperating larger beveled gear 51 carried on the grainward end of a stubblewardly extending short shaft 52 journaled in a U-shaped bracket 53 having arms 54 rigidly attached to the frame 1 and extending outward stubblewardly therefrom beneath the pitman shaft 42. On the stubbleward end of this short shaft 52 a second beveled gear 55 is carried which meshes with a smaller coöperating beveled gear 56 carried on a longitudinally disposed threaded or worm member 57, which is in turn rotatably mounted in spaced brackets 58, 59 preferably integral and rotatably mounted on the shaft 52. As shown, an internally threaded sleeve 60 preferably extends through these brackets 58, 59 and the gear 56 and surrounds a section of the worm, the gear 56 being fixed to this sleeve 60 by any suitable connection, as, for instance, a set screw 61, so that upon the rotation of the pitman shaft, i. e., when the grain varies in length, this worm 57 will be fed longitudinally with respect to that gear 56.

In order to limit the movement of the parts and provide for disconnecting the clutch member 40 from its coöperating ratchet members 43, 44 and throwing the parts to their neutral position at certain predetermined limits, I provide a stubblewardly extending controlling lever 62 pivoted at a point intermediate its ends, as at 63, to the bracket 53, which lever 62 has one end pivoted at 64 to the yoke 38 and at its opposite end is provided with a loop 65 adapted to inclose and move along the horizontal portion of a substantially U-shaped rod 66 fixed at its ends to the threaded rod or worm 57 so as to move therewith by any suitable means, such as the adjustable collars and set screws 67. Upon this rod the travel limiting means or stops are carried, these means being shown herein in the form of pins 68 having driving fit connections with the rod and adjustable as desired in a plurality of openings 69 in that rod to enable the limits of travel of the parts to be varied as desired.

To the threaded member 57 are connected means on the shocker frame for adjusting the height of the receptacle 19. As shown, this rod 57 is pivotally connected at its front end through the pivotal connection 70 of the brackets 58, 59 to the shaft 52 in such a manner that it can be swung vertically about that shaft as a pivot when the shocker passes over rough ground. At its rear end this rod 57 is also pivoted at 71 to a depending link 72 pivotally mounted at 73 on a suitable bracket on the shocker frame 12. It is thus seen that as the rod 57 is adjusted longitudinally upon variation in the length of the grain, the link 72 attached to the rear end thereof will be swung about its pivot on the shocker frame 12 in such a manner as to impart a longitudinal movement to a rearwardly extending link 74 pivotally connected at 75 to the member 72. This link 74 is in turn operatively connected through a clip 76 to the front ends of a pair of cables 77 extending around guide sheaves 78 carried on the bottom of the frame 12, and other sheaves 79 carried on opposite sides of the shock receptacle on the frame standards 80. These cables 77 are in turn connected at their rear ends to members 81 fixed on the wheel frame standards 82 in such a manner that when the member 72 is moved about its pivot, the front ends of these cables will be moved longitudinally of the shocker frame 12 in one direction or the other and through their sheave connections with this shocker frame above described, will act to raise or lower the latter bodily with respect to the wheel members 82 and thereby vary the elevation of the shock receptacle 19 with respect to the ground.

From the above it is believed that the operation of this automatic mechanism will be clear, but in order that no question may arise as to the same, the operation will be here reviewed more in detail. As the grain fed out over the binder deck 4 varies in length, the head board 7 of the binder will obviously adjust itself in accordance with the length of the grain, being pulled in by the spring 8 when the grain is short and being forced out by the pressure of the grain when the grain is long. To illustrate, let us consider the operation of the device when the grain increases in length. The head board will then be moved outward and the members 22, 24 and 35 will be operated to shift the splined clutch member 40 toward the left (Fig. 3) into engagement with the ratchet faces 43 on the rotatably mounted beveled gear 45, carried on the continuously rotating pitman shaft 42, in such a manner as to lock that beveled gear to that shaft and thereby so convey the rotation of that shaft to the gears 51, 55 and 56 that the threaded member 57 will be fed toward the left in the construction shown in Figs. 1 and 3. This will result in the member 72, to which the member 57 is connected, being thrown to the left of the position shown in Fig. 6, or forward in the position shown in Fig. 1, in such a manner as to pull out the cables 77 and thereby, through the sheaves 79, act to raise the frame 12 of the shocker bodily with respect to the wheel standard 82, carrying with it the shock receptacle 19. In other words, when the grain increases in length, the shock receptacle will be raised with respect to the truck of the shocker through mechanism controlled by the length of the grain and operated by a moving part of the binder mechanism. This movement will obviously continue so long as the clutch member 40 is held in mesh with the ratchet teeth 43 on the gear 45, and, unless sooner interrupted by a change in the length of the grain, will be automatically interrupted when the loop 65 on the end of the member 62 strikes the right-hand stop 68 (shown in Fig. 3) carried on the U-shaped member 66. When this occurs, the member 40 will be automatically thrown out of mesh with the ratchet 43 on the gear 45 and into neutral position so that the shock receptacle will remain at the desired height, while the grain remains of the same length. When, on the contrary, the grain supplied to the binding mechanism becomes shorter, the head board 7 will, of course, swing inward with the result of connecting the clutch member 40 to the other ratchet 44 and gear 46, whereupon, through the mechanism described above, the member 57 will be fed in the reverse direction, with the result of lowering the shock receptacle to the desired height, the parts in this instance being disconnected by the engagement of the loop 65 with the left-hand stop 68 unless sooner interrupted by a change in the length of the grain.

In that form of my invention wherein the means for adjusting the shocker are driven from a moving part of the equipment and are under the control of the operator, I provide a handle 83 (Figs. 1 and 2) on the upper end of the rod 24, and extending within reach of the operator when upon his seat 84 on the binder. This handle is preferably attached to a sleeve 85 fixed to the upper end of the rod 24 by a set screw 86, the driving pin connection 23 extending through this sleeve and the head board rod 22, as hereinabove described. Through this construction it is to be noted that the operator may at any time throw the adjusting mechanism for the shocker into gear with the binder so that the shock receptacle 19 of the frame will be raised or lowered with respect to the ground, depending upon the direction in which the handle 83 is turned, the clutch parts of the adjusting mechanism, as hereinabove described, normally tending to occupy their neutral position shown in Fig. 1, and the shocker being held in each position to which it is adjusted by the worm connection 57. Attention is here also directed to the fact that if desired the operator, by removing the pin 23, may use this adjusting mechanism independently of the automatic adjusting mechanism, the head board in this instance operating as an ordinary head board and without actuating the clutch adjusting mechanism, the latter being set in operation by the operator when he desires to adjust the height of the shocker by simply adjusting the handle 83. Further, when operating on large areas where the grain is quite uniformly long or short, it is obvious that the operator, after the shock receptacle has been adjusted to the desired height either automatically or by manipulation of the handle 83, may remove this pin 23 and thereby decrease the amount of work required to be done by the head board.

It is, of course, to be understood that the form of mechanism used to adjust the shocker may be varied if desired, the invention not being limited to the specific form of mechanism shown and being adapted to embodiment in any suitable mechanism for varying the height of the shock receptacle, whether it is controlled by the length of the grain or not, or to embodiment in any mechanism controlled by the length of the grain or otherwise which adjusts the shock receptacle through connections with the binder mechanism, or any other moving part of the equipment, wherein the actual work of adjusting is done by the team drawing the latter. Here it is also, of course, to be understood that where the mechanism is controlled by the movement of the head board, the parts of the same should be as light as practical and mounted in bearings adapted to move with the least resistance in order to reduce the amount of work to be done by the head board, and that under certain circumstances any desirable auxiliary mechanism may be used in order that the work required to be done by the head board may be still further reduced. These, however, are mechanical adaptations of my invention which will be obvious to one skilled in the art in adapting it to the different conditions under which it will be required to operate, and therefore need not be herein specifically set forth.

Having herein thus specifically described one embodiment of my invention in such a manner that the principle of operation of the same may be understood and that the same may be adapted to use by those skilled in the art, the invention will now be claimed.

What I claim as my invention and desire to secure by Letters Patent is:

1. In a shocking machine, shock setting mechanism, and automatically acting means for varying the elevation thereof with respect to the ground set in operation by the grain being shocked.

2. In a shocking machine, shock setting mechanism, and means for raising or lowering the same with respect to the ground automatically actuated by the grain being shocked upon an increase or decrease in length of the latter.

3. In a shocker, a shock receptacle, and means automatically controlled by the grain being shocked for automatically varying the elevation of said receptacle with respect to the ground.

4. In a shocking machine, a frame, a shock receptacle thereon, and means automatically set in operation by an increase in length of the grain being shocked for raising said receptacle with respect to the ground.

5. In a shocking machine, a frame, a shock receptacle thereon, and means automatically set in operation by a decrease in length of the grain being shocked for lowering said receptacle toward the ground.

6. In a shocking machine, a frame, a shock receptacle thereon, and means automatically set in operation by an increase or decrease in length of the grain being shocked for respectively raising or lowering said receptacle with respect to the ground.

7. In a shocking machine, a frame, a shock receptacle pivoted thereon, and means controlled by the grain being shocked for automatically adjusting the pivot of said receptacle with respect to the ground.

8. In a shocking machine, a frame, a receptacle pivoted thereon, and means operable upon variation in the length of the grain being shocked and controlled thereby for varying the elevation of said pivot with respect to the ground.

9. In a shocking machine, a frame, a shock receptacle pivoted thereon, and means acting automatically upon variation in the length of the grain being shocked and controlled thereby for varying the elevation of said pivot with respect to the ground.

10. In a shocking machine, a frame, a shock receptacle pivoted thereon, and means acting automatically upon an increase in length of the grain being shocked and set in operation thereby for raising the pivot of said receptacle with respect to the ground.

11. In a shocking machine, a frame, a shock receptacle pivoted thereon, and means acting automatically upon a decrease in length of the grain being shocked and set in operation thereby for lowering the pivot of said receptacle toward the ground.

12. In a shocking machine, a frame, a shock receptacle pivoted thereon, and means acting automatically upon an increase or decrease in length of the grain being shocked and set in operation thereby for raising or lowering the pivot of said receptacle with respect to the ground.

13. In a shocking machine, a frame, a shock receptacle pivoted thereon having its pivot movable with respect to said frame, and means controlled by the grain being shocked controlling the movement of said pivot.

14. In a shocking machine, a frame, a shock receptacle pivoted thereon having its pivot movable with respect to the ground, and means actuated automatically upon variation in length of the grain being shocked and controlled by the latter controlling the movement of said pivot.

15. In a shocking machine, a frame, a tilting shock receptacle pivoted thereon having a pivot movable with respect to the ground, and means actuated by the grain being shocked controlling the movement of said receptacle pivot.

16. In a shocking machine, a frame, a tilting shock receptacle pivoted thereon having a pivot movable with respect to the ground, and means actuated by the grain being shocked for varying the elevation of said pivot.

17. In a shocking machine, a frame, a tilting shock receptacle pivoted thereon having a pivot movable with respect to the ground, and means actuated by the grain being shocked for raising said pivot with respect to the ground upon an increase in length of said grain.

18. In a shocking machine, a frame, a tilting shock receptacle pivoted thereon having a pivot movable with respect to the ground, and means actuated by the grain being shocked for lowering said pivot toward the ground upon a decrease in length of said grain.

19. In a shocking machine, a frame, a tilting shock receptacle pivoted thereon having the pivot movable with respect to the ground, means actuated by the grain being shocked for raising or lowering said pivot with respect to the ground upon an increase or decrease in length of said grain.

20. In combination, a binder, a shocker operatively connected thereto, a shock receptacle on said shocker, and means operatively connectible to a moving part of said binder for varying the elevation of said shock receptacle with respect to the ground.

21. In combination, a binder, a shocker operatively connected thereto, a shock receptacle carried on said shocker, and means operatively connectible to a moving part of the binder and under the control of the grain being shocked for varying the elevation of said receptacle with respect to the ground.

22. In combination, a binder, a shocker operatively connected thereto, a shock receptacle carried on said shocker, and grain controlled means for varying the elevation of said receptacle with respect to the ground automatically connectible to a moving part of the binder upon variation in length of the grain to be shocked.

23. In combination, a binder, a shocker operatively connected thereto, shock setting mechanism carried on said shocker, and automatic means for varying the elevation of said mechanism with respect to the ground including operative connections between the same and a moving part of said binder.

24. In combination, a binder, a shocker operatively connected thereto, shock setting mechanism carried on said shocker, and means including clutch mechanism connectible with a moving part of the binder for varying the elevation of said mechanism with respect to the ground.

25. In combination, a binder, a shocker operatively connected thereto, a shock receptacle carried on said shocker, and means for varying the elevation of said receptacle with respect to the ground including mechanism under the control of the operator on said binder and operatively connectible to a moving part of the latter.

26. In combination, a binder, a shocker operatively connected thereto, a shock receptacle carried on said shocker, means for varying the elevation of said receptacle with respect to the ground operatively connected between said shocker and binder and including a clutch, and means operable by the operator on the binder for controlling the connection of said clutch.

27. In combination, a binder, a shocker operatively connected thereto, a shock receptacle on said shocker, means for varying the elevation of said receptacle with respect to the ground operatively connected between said shocker and the binder and including a clutch, and means controlled by the grain being shocked controlling the connection of said clutch.

28. In combination, a binder, a shocker operatively connected thereto, a shock receptacle carried on said shocker, means for varying the elevation of said receptacle with respect to the ground operatively connected between said shocker and the binder and including a clutch, and means actuated by the grain delivered by said binder to said shocker controlling the connection of said clutch.

29. In combination, a binder, a shocker operatively connected thereto, a shock receptacle on said shocker, a head board on said binder, operative connections between a moving part of said binder and said shock receptacle for varying the elevation of the latter with respect to the ground, said connections including a clutch, and operative connections between said head board and said clutch for controlling the connection of the latter.

30. In combination, a binder, a shocker operatively connected thereto, a shock receptacle carried on said shocker, a head board carried on said binder, means for varying the elevation of said shock receptacle with respect to the ground, means operatively connected between said elevation varying means and a moving part of said binder including a clutch, and clutch shipping means controlled by the movement of said head board.

31. In a shocking machine, a frame, a tiltable shock receptacle thereon, and means for automatically eliminating the crumpling of the butts of the sheaves in a shock set by said receptacle as the latter is tilted including automatically acting mechanism controlled by the grain for varying the elevation of said receptacle with respect to the frame in accordance with a variation in length of the grain being shocked.

32. In combination, a wheeled frame, a shocker frame carried thereon and adjustable with respect thereto, a shock receptacle carried on said shocker frame, a binder, and means operatively connected between said binder and said frame and driven from said binder for varying the elevation of said shocker frame with respect to the ground and thereby varying the elevation of said shock receptacle.

33. In combination, a binder, a shocker operatively connected thereto, a shock receptacle on said shocker, means for delivering to said receptacle sheaves ejected from said binder, and automatically acting means for varying the elevation of said shock receptacle with respect to the ground set in operation by variations in length of the grain delivered by said delivery means.

34. In combination, a binder, a shocker operatively connected thereto, a shock receptacle on said shocker, means for delivering to said receptacle sheaves ejected from said binder, and automatically acting means for varying the elevation of said shock receptacle with respect to the ground set in operation by variation in length of the grain delivered to said delivery mechanism.

35. In combination, a binder, a shocker operatively connected thereto, shock setting mechanism carried on said shocker, mechanism for delivering to said mechanism sheaves ejected by said binder, and automatically actuated means controlled by the grain for varying the elevation of said shock setting mechanism with respect to the ground in accordance with variations in the length of the grain to be shocked and without interruption of said delivering mechanism.

36. In combination, a binder, a shocker operatively connected thereto, shock setting mechanism carried on said shocker, mechanism for delivering to said shock setting mechanism sheaves ejected by said binder, and means automatically set in operation by variations in length of the grain to be shocked for varying the position of said shock setting mechanism with respect to the ground in accordance with such variations.

37. In combination, a binder, a shocker operatively connected thereto, a shock receptacle pivoted on said shocker, means including a swinging sheaf delivery member carried on said shocker delivering to said shock receptacle sheaves ejected from said binder, and means set in operation by the grain delivered to said swinging sheaf delivery member for varying the elevation of said shock receptacle with respect to the ground.

38. In combination, a binder, a shocker operatively connected thereto, a shock receptacle pivoted on said shocker, means including a swinging sheaf delivery member carried on said shocker delivering to said shock receptacle sheaves ejected from said binder, and automatically acting means set in operation by the grain for varying the elevation of said shock receptacle with respect to the ground in accordance with variations in the length of the grain delivered to said sheaf delivery member.

39. In combination, a binder, a shocker operatively connected thereto, a shock receptacle carried on said shocker, means including a swinging sheaf delivery member carried on said shocker delivering to said shock receptacle sheaves ejected from said binder, and means engaged by the grain as it is delivered by said binder to said sheaf delivery member for varying the elevation of said shock receptacle with respect to the ground in accordance with variations in the length of said grain.

40. In combination, a binder, a shocker operatively connected thereto, a shock receptacle carried on said shocker, means for varying the elevation of said receptacle with respect to the ground, and means for automatically connecting said elevation varying means to a moving part of the binder upon a variation in the length of the grain to be shocked.

41. In combination, a binder, a shocker operatively connected thereto, a shock receptacle carried on said shocker, means for varying the elevation of said receptacle with respect to the ground, means for automatically connecting said elevation varying means to a moving part of the binder upon a variation in the length of the grain to be shocked, and means for disconnecting said automatic connecting means and placing said elevation varying means under the control of an operator.

42. In combination, a binder, a shocker operatively connected thereto, a shock receptacle carried on said shocker, means controlled by the grain for varying the elevation of said receptacle with respect to the ground operatively connectible with a moving part of the binder automatically upon variation in length of the grain to be shocked, and means for placing said mechanism under the control of the operator on the binder and eliminating the automatic control by the grain when said shock receptacle is in any desired position.

43. In combination, a machine for forming grain into sheaves and setting said sheaves in shocks including shock setting mechanism, and means controlled by the grain automatically connectible with a moving part of said machine while the latter moves forward in the field for varying the position of said shock setting mechanism with respect to the ground as the grain being shocked varies in length.

44. In combination, a machine for forming grain into sheaves and setting said sheaves in shocks including shock setting mechanism, and means under the control of the operator and operatively connectible at will with a moving part of said machine while the latter moves forward in the field for varying the position of said shock setting mechanism with respect to the ground as the grain being shocked varies in length.

In testimony whereof I affix my signature, in the presence of two witnesses.

HORACE L. ROCKWELL.

Witnesses:
W. A. LOFTUS,
C. M. OBERBECK.